April 29, 1958     C. P. LILJENGREN     2,832,398
AIRCRAFT TYPE SEAT CONSTRUCTION
Filed May 19, 1951     4 Sheets-Sheet 1
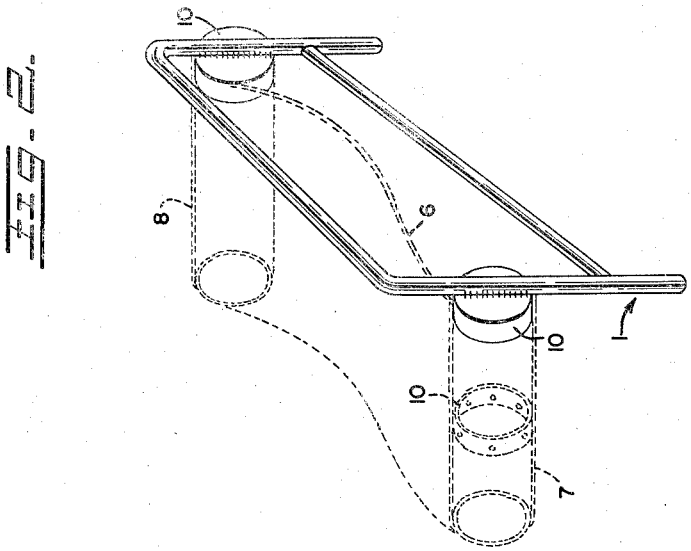
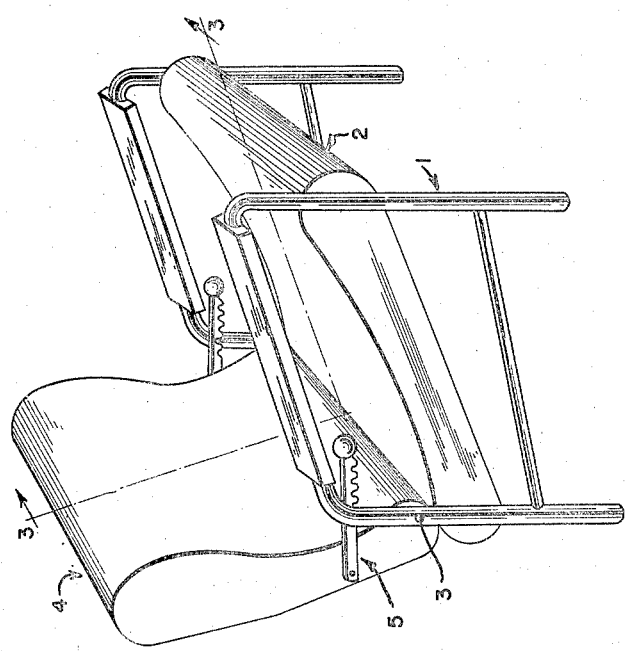
INVENTOR.
CURTIS P. LILJENGREN April 29, 1958
C. P. LILJENGREN
2,832,398
AIRCRAFT TYPE SEAT CONSTRUCTION
Filed May 19, 1951
4 Sheets-Sheet 2
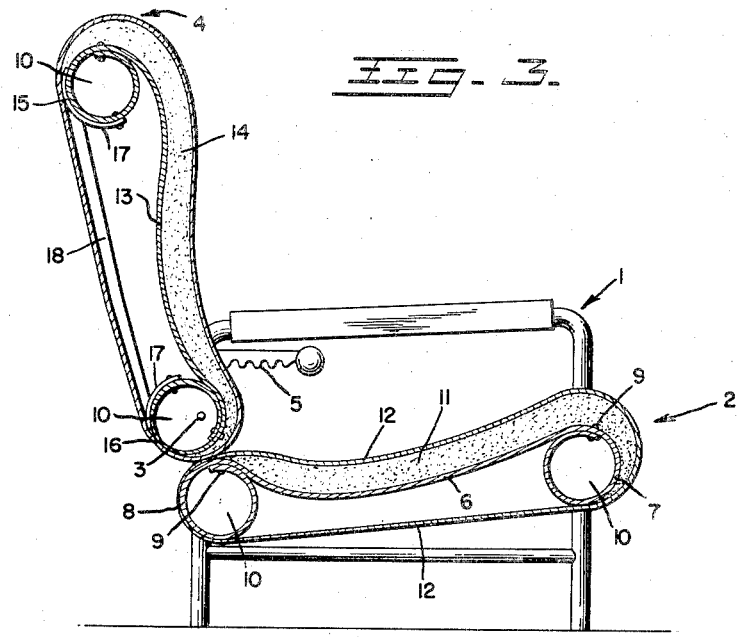
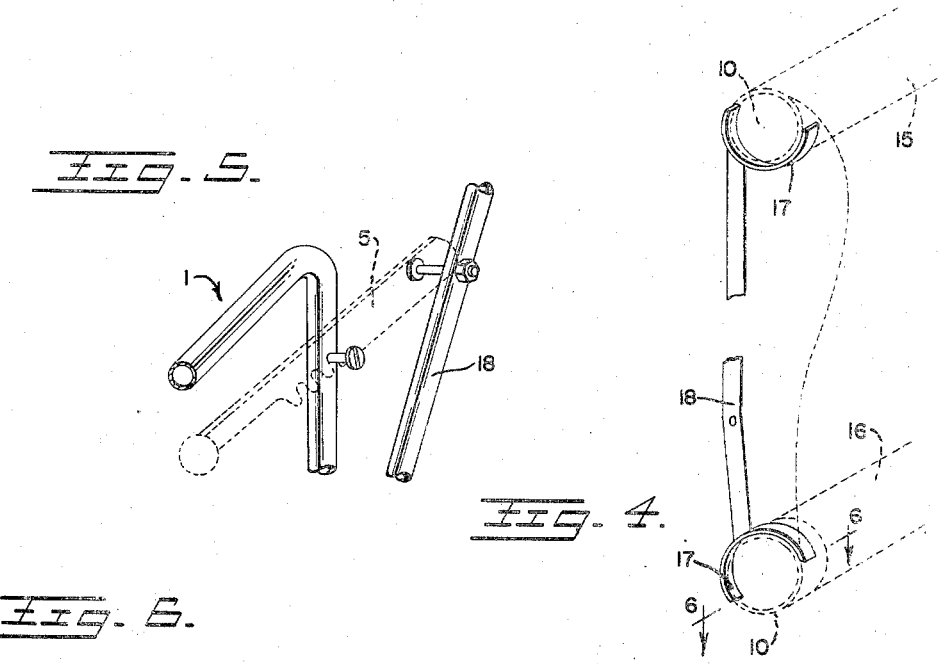
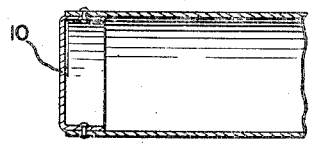
INVENTOR.
CURTIS P. LILJENGREN April 29, 1958   C. P. LILJENGREN   2,832,398
AIRCRAFT TYPE SEAT CONSTRUCTION
Filed May 19, 1951   4 Sheets-Sheet 3

FWD.

INVENTOR.
CURTIS P. LILJENGREN
BY Albert B. Kirchner
attorney

April 29, 1958 C. P. LILJENGREN 2,832,398
AIRCRAFT TYPE SEAT CONSTRUCTION
Filed May 19, 1951 4 Sheets-Sheet 4
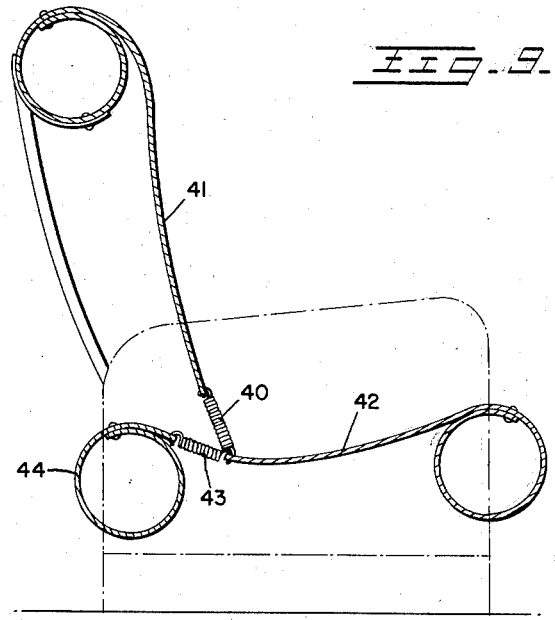
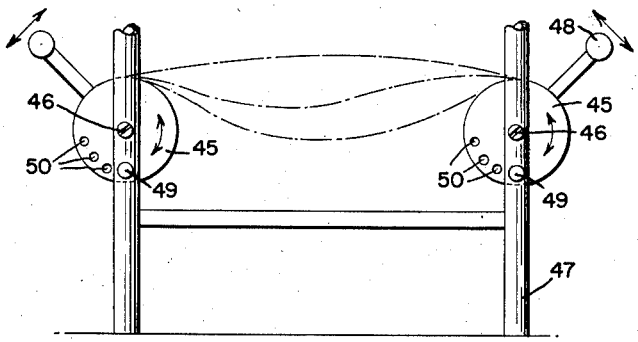
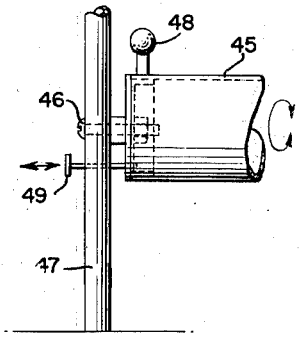
INVENTOR.
CURTIS P. LILJENGREN
BY Albert H. Kirchner
Attorney United States Patent Office 2,832,398
Patented Apr. 29, 1958

2,832,398

AIRCRAFT TYPE SEAT CONSTRUCTION

Curtis P. Liljengren, Miami, Fla., assignor to Flight Equipment and Engineering Corp., Miami, Fla., a corporation of Florida Application May 19, 1951, Serial No. 227,225

4 Claims. (Cl. 155—53)

The present invention relates to seat constructions, and more particularly to the general type of seats which are specially suitable for installation in the passenger cabins of aircraft.

More particularly the invention contemplates certain new and useful improvements in the cushion members which form important parts of the seat bottoms and seat backs and improvements in the mounting of such members in the frame structure.

A principal object of the invention is to provide comfortable seating in lightweight, simple, inexpensive and durable structural embodiments.

An important feature of the invention is its capacity to provide cushion members for the seat bottom and/or the seat back which will have predetermined contours approximating the configuration capable of affording maximum comfort to the average occupant with provision, however, for automatic varying of the contour to conform to each particular individual occupant.

These and related objects, which will appear more in detail hereinafter, are attained by the use of a novel combination of material, shapes and mountings of cushion assemblies, mountings and relationships including sheet metal pan members which are inherently resilient and are so formed and mounted in the customary framing as to adjust their preset shapes to conform accurately to the configuration of substantially any individual occupant.

Another object is to provide a seat having the attractive superficial appearance of a massive, heavy construction which, however, is actually generally hollow and hence light in weight, being assembled largely from thin shell-like components, thus resulting in economy of materials and providing internal space in which may be located pockets for the storage of life preservers and other articles.

In certain preferred forms of embodiment the structure provided by the present invention includes cushion member framing elements which are relatively yieldable under crash load impacts so as to minimize passenger injury, therefore being superior to the small diameter rigid metal members heretofore extensively used.

In the accompanying drawings, which illustrate certain preferred embodiments of the invention:

Figure 1 is a perspective view of a finished single occupant seat embodying the invention;

Fig. 2 is a detail perspective generally diagrammatic view showing one form of attachment of the seat bottom pan end elements to a supporting frame member;

Fig. 3 is a central longitudinal section taken on the line 3—3 of Fig. 1;

Fig. 4 is a detail perspective view showing one form of attachment of the seat back pan end elements to a back frame supporting member;

Fig. 5 is a detail perspective view showing a form of back recline adjusting mechanism;

Fig. 6 is a detail sectional view taken on the line 6—6 of Fig. 4;

Fig. 9 is a diagrammatic view illustrating still another embodiment;

Fig. 10 is a diagrammatic side view of a further embodiment;

Fig. 11 is a detail front elevational view of the structure shown in Fig. 10.

Figure 12:
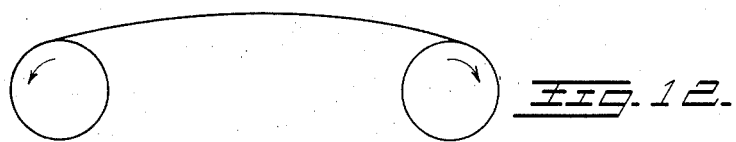
Figs. 12–14 are diagrammatic views showing some of the cushion member contours obtainable by practice of the invention.

Generally speaking, the forgoing and other objects are attained by forming the cushion members for the back and/or the bottom of the seat of resilient sheet metal so mounted and formed or stressed as to provide a predetermined contour more or less accurately conforming to the average individual requirement but yieldable for automatic adjustment to individual occupant requirements.

Referring to the drawings, Fig. 1 shows a seat including a supporting frame designated generally 1 which is adapted to be secured to a floor or the like (by means not shown) and mount a seat bottom cushion designated generally 2. Connected to the supporting frame in any suitable manner, as by pivots 3, is a back cushion member designated generally 4 which, in the illustrated embodiment, is reclinable to various angles under the control of a locking arm 5 pivoted to the back and adjustably connectible to the supporting frame.

Fig. 3 shows certain forms of the cushion members which the present invention provides for the seat bottom and seat back. Referring first to the seat bottom cushion member 2, this member comprises principally a pan portion 6 made of thin resilient sheet metal such as aluminum alloy of 0.020 inch thickness. The sheet is initially generally rectangular in plan and has each of its front and rear edge margins rolled to form a round tubular element, as shown at 7 in the front of the seat and at 8 in the rear. The sheet metal is fixed in these tubular shapes in any suitable manner, as by the rivets shown at 9. The result is a merging of the body span of the pan into volute curved zones. In the Fig. 3 form of the invention the tubular elements 7 and 8 constitute rigid transverse beams, which may be stiffened if desired or thought necessary by interposing internal bracing such as the cups 10 shown in Fig. 2 and Fig. 6. The elements 7 and 8 are mounted transversely in the supporting frame 1 in any suitable manner, as by welding the ends of the end closure cups 10 directly to upright members of the framing structure 1. The upper surface of the pan and more or less of the contiguous surface of each of the end elements is covered with a layer of cushion material such as the slab 11 of one inch foam rubber covered by a sheet of upholstery fabric 12.

Figure 13:
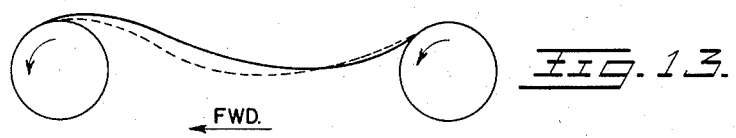
Figure 14:
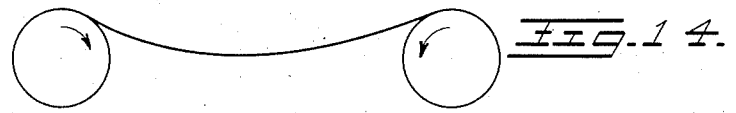
Figure 7:
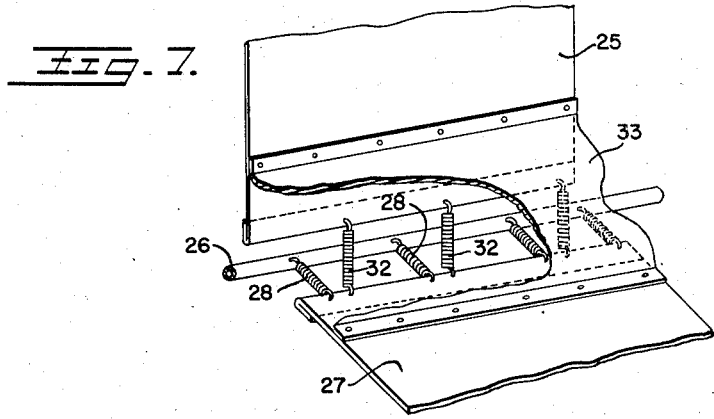
Fig. 7 is a detail perspective view showing, in a different embodiment of the invention, one form of connection for the adjacent edges of the back cushion pan and bottom cushion pan.

Before the cushion member assembly is installed in the frame torque is applied to each of the end elements to introduce into the pan portion any desired predetermined contour, as shown in Figs. 12–14, in which the arrows indicate the direction of the torque applied to the elements. Thus stressed, the portions of the cushion member assembly are fixed in position. The predetermined contour is maintained while the seat remains unoccupied but automatically adjusts itself to conform to the contour requirements of any occupant. Thus the initial contour of the member shown in Fig. 13 includes a low area adjacent the rear, at the right hand side of the figure, as shown in full lines, and this low area may move forward, as shown by the broken lines, if the occupant slides forward in the seat. It will be understood that various other changes in the position of the occupant produce corresponding changes in the seat pan contour, the latter in each instance conforming accurately to the occupant's requirements.

The seat back cushion member 4 is in the Fig. 3 embodiment made like the seat bottom cushion member 2, having a pan portion 13, upholstered foam rubber slab 14, and upper end element 15 and lower end element 16. The end elements are fixed in the back, as by riveting their end portions, stiffened by closure cups 10, to metal straps 17 welded to back uprights 18. The end elements 15 and 16 are torqued before attaching to the straps 17 so as to introduce into the pan portion the desired predetermined contour as shown. This contour adjusts itself automatically to the occupant's requirements in the same way as has been explained in connection with the seat bottom cushion member.

The curved area adjacent the upper end element 15 may be, and preferably is, so contoured as to provide a highly resilient head rest. Such contouring may of course be provided immediately adjacent to any of the end elements of either of the pan portions but is of particular utility as a head rest adjacent the upper end element 15.

Figure 8:
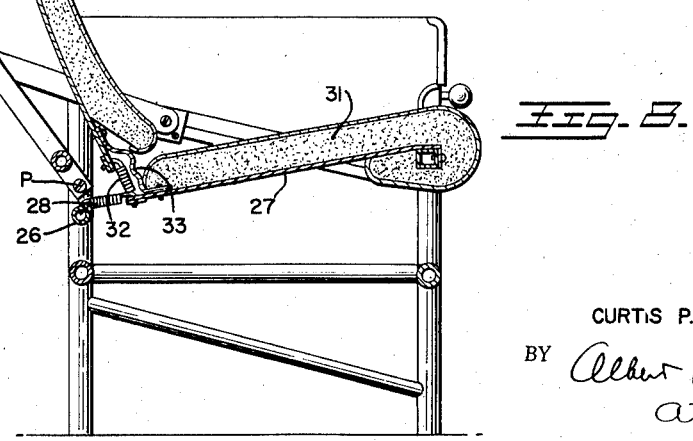
Fig. 8 is a vertical central sectional view of a complete seat structure showing the embodiment of Fig. 7.

The constructions thus far described are provided at each end with a rolled tubular member or portion, thus introducing a volute curve in each end portion of the pan. Within the broad spirit of the invention, as defined by the broader of the appended claims, one of such tubular end elements and the adjacent volute curved portion of the pan may be dispensed with. Such a construction is shown embodied in the back 20 in Fig. 8, where the pan portion 25 with its foam rubber slab 30 constitutes an assembly which terminates at its end in a free edge which is connected by springs 32 to the similar free rear edge of the seat bottom pan 27. The assembly or combination of both pans 25 and 27 may if desired be connected to an adjacent frame member, such as the cross member 26, by springs 28. The springs 32 and 28 are short coil tension springs and may be provided in any number found necessary. When springs 32 and/or 28 are used it is desirable to mask them as by a sheet 33 of canvas or the like attached at its margins to the adjacent edge zones of the pans 25 and 27.

Fig. 9 shows diagrammatically a very similar arrangement in which springs 40 connect the free lower end of the seat back pan 41 to the free rear edge of the seat bottom pan 42, and springs 43 connect the free edge of the latter with a sheet metal roll element 44 fixed in the supporting frame.

In all the foregoing constructions the end elements are fixed permanently in position in the supporting framing. To provide a construction in which the initially predetermined contour may be varied it is necessary merely to mount the pan end elements for rotational adjustment in the framing structure. This can be accomplished, as shown in Figs. 10 and 11, by journaling the end cups of elements 45 on pivot pins 46 mounted in the adjacent framing structure 47. A handle 48 may be used to provide the necessary leverage to rotate the elements, and a locking pin 49 may be inserted through the framing into selected holes 50 in the end cups. Fig. 10 illustrates in broken lines some of the contour changes that result from rotation of the end elements.

It is to be understod that the foregoing illustrations and description of the preferred embodiments are merely for the purpose of exemplifying the inventive principles. These principles may be otherwise embodied and need not all be used in the particular combinations shown, and all modifications thereof within the spirit of the appended claims are to be deemed within the scope and purview thereof.

I claim:

1. In a seat construction, a supporting frame, a cushion member comprising a body span of thin resilient sheet metal having one end portion anchored to said frame and terminating at its other end in a volute curved zone of circular cross section rotated and anchored to said supporting frame to stress the body span to a predetermined contour including a dished area, said body span being devoid of direct subjacent support whereby said contour is adapted automatically to change with movement of said dished area toward and away from said end portion to conform to varying locations of a load imposed thereon.

2. In a seat construction, a supporting frame, a cushion member comprising a body span of thin resilient sheet metal having each opposite end portion terminating in a volute curved zone of circular cross section rotated and anchored to said supporting frame in a state of torque to stress the body span to a predetermined contour including a dished area, said body span being devoid of direct subjacent support whereby said contour is adapted automatically to change with movement of said dished area relatively to said volute curved zones to conform to varying locations of a load imposed thereon.

3. In a seat construction, a supporting frame, a cushion member comprising a body span of thin resilient sheet metal having each opposite end portion terminating in a volute curved zone connected to said supporting frame and prestressed in a state of torque to give the body span a predetermined contour including a dished area, said body span being devoid of direct subjacent support whereby said contour is adapted automatically to change with movement of said dished area relatively to said volute curved zones to conform to varying locations of a load imposed thereon, and means mounting at least one of said torqued end portions for rotation in the frame about its longitudinal axis to selected adjusted positions adapted to vary the torque and thereby vary the contour of the body span.

4. The combination claimed in claim 3, including means mounting each of said torqued end portions for rotation in the frame about its longitudinal axis to selected adjusted positions adapted to vary the torque and thereby vary the contour of the body span.

References Cited in the file of this patent

UNITED STATES PATENTS

| 190,388 | Tostevin | May 1, 1877 |
| 434,495 | Woods | Aug. 19, 1890 |
| 2,149,350 | Kloppman | Mar. 7, 1939 |
| 2,202,630 | Hauber | May 28, 1940 |
| 2,324,318 | Niedringhaus | July 13, 1943 |

FOREIGN PATENTS

| 13,522 | Great Britain | July 27, 1889 |